United States Patent
Schmidt et al.

(10) Patent No.: US 10,329,031 B2
(45) Date of Patent: Jun. 25, 2019

(54) ELECTRICITY DISPERSION FOR AIRCRAFT EVACUATION ASSEMBLIES

(71) Applicant: Goodrich Corporation, Charlotte, NC (US)

(72) Inventors: Ryan Schmidt, Gilbert, AZ (US); Craig Erwin Prevost, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 222 days.

(21) Appl. No.: 15/186,135

(22) Filed: Jun. 17, 2016

(65) Prior Publication Data
US 2017/0361945 A1    Dec. 21, 2017

(51) Int. Cl.
*B64D 25/14*    (2006.01)
*B64D 45/02*    (2006.01)

(52) U.S. Cl.
CPC ............. *B64D 45/02* (2013.01); *B64D 25/14* (2013.01)

(58) Field of Classification Search
CPC ................................ B64D 25/14; B64D 45/02
See application file for complete search history.

(56) References Cited

U.S. PATENT DOCUMENTS

| | | | |
|---|---|---|---|
| 3,234,044 A | 2/1966 | Andes et al. | |
| 3,433,342 A * | 3/1969 | Switlik | B64D 25/14 193/25 B |
| 3,621,383 A * | 11/1971 | Rush | B64D 25/14 182/48 |
| 3,656,579 A * | 4/1972 | Fisher | B64D 25/14 182/48 |
| 3,755,713 A * | 8/1973 | Paszkowski | B29C 70/885 244/1 A |
| 4,502,092 A * | 2/1985 | Bannink, Jr. | B64D 45/02 244/1 A |

(Continued)

FOREIGN PATENT DOCUMENTS

GB    1246999    9/1971

OTHER PUBLICATIONS

EP Search Report dated Nov. 7, 2017 in EP Application No. 17172412.3.

*Primary Examiner* — Michael H Wang
(74) *Attorney, Agent, or Firm* — Snell & Wilmer, L.L.P.

(57) ABSTRACT

An aircraft evacuation assembly for electricity dispersion may include a composite packboard housing defining a packboard compartment, wherein the composite packboard housing is electrically nonconductive, and a girt mounted to the composite packboard housing and disposed in the packboard compartment. The evacuation assembly may further include a metal stud extending through the composite packboard housing, wherein the metal stud includes a first end portion disposed external to the packboard compartment and a second end portion disposed internal to the packboard compartment in electrical contact with the girt. The evacuation assembly may further include a flexible strip attached to an external surface, relative to the packboard compartment, of the composite packboard housing. The flexible strip may be electrically conductive and the flexible strip may extend between and electrically connect the first end portion of the metal stud and an electrical interface.

9 Claims, 6 Drawing Sheets

(56) References Cited

U.S. PATENT DOCUMENTS

| | | | | |
|---|---|---|---|---|
| 4,628,402 A * | 12/1986 | Covey | B64D 45/02 361/218 |
| 4,642,727 A * | 2/1987 | Dalal | H05K 9/0067 361/212 |
| 4,755,904 A * | 7/1988 | Brick | B64D 45/02 244/1 A |
| 4,920,449 A * | 4/1990 | Covey | H05F 3/02 244/1 A |
| 5,542,629 A * | 8/1996 | Kashihara | B64D 25/14 182/48 |
| 7,050,286 B2 * | 5/2006 | Pridham | B64D 45/02 244/1 A |
| 7,380,755 B2 * | 6/2008 | Matsch | B64C 1/1423 244/137.2 |
| 7,886,439 B2 * | 2/2011 | Braden | H01R 4/646 244/1 A |
| 7,898,785 B2 * | 3/2011 | Winter | B64D 37/32 361/117 |
| 8,482,897 B2 * | 7/2013 | Oguri | B64D 45/02 361/218 |
| 8,791,375 B2 * | 7/2014 | Fisher | B64D 37/32 174/653 |
| 9,343,824 B2 * | 5/2016 | Heeter | B64D 45/02 |
| 2004/0074696 A1 * | 4/2004 | Horvath | B64D 25/14 182/48 |
| 2007/0023578 A1 | 2/2007 | Myers | |
| 2012/0325586 A1 | 12/2012 | Meggs | |
| 2013/0216767 A1 * | 8/2013 | Cinquin | B29C 70/228 428/102 |
| 2013/0271891 A1 * | 10/2013 | Shimp | H02H 1/04 361/220 |
| 2014/0166805 A1 | 6/2014 | Marty | |
| 2014/0168847 A1 * | 6/2014 | Mueller | B29C 70/885 361/220 |
| 2014/0197273 A1 * | 7/2014 | Steinwandel | B29C 70/885 244/1 A |
| 2015/0166743 A1 * | 6/2015 | Restuccia | C08J 5/10 428/327 |
| 2015/0307206 A1 * | 10/2015 | Kruckenberg | B64D 45/02 252/74 |
| 2016/0257394 A1 * | 9/2016 | Gleason | B29C 70/882 |
| 2016/0368619 A1 * | 12/2016 | Prevost | B64D 25/14 |

* cited by examiner

ELECTRICITY DISPERSION FOR AIRCRAFT EVACUATION ASSEMBLIES

FIELD

The present disclosure relates to electricity dispersion structures, and more specifically, to transferring electricity received by an evacuation assembly.

BACKGROUND

In the event of an aircraft evacuation, evacuation assemblies, such as evacuation slides, are often deployed to safely usher passengers from the aircraft to the ground. For the safety of the passengers, it is beneficial for an electrical path to extend between a toe-end of the evacuation assembly (e.g., the end of an evacuation slide that contacts the ground) and the main electrical ground of the aircraft. With such an electrical path, electricity, such as static electricity, can be safely dispersed. However, certain composite components of aircraft evacuation assemblies, such as packboards, are often constructed from composite materials that are electrically nonconductive. Because such components are electrically nonconductive, the electrical path between, for example, the evacuation slide and the main electrical ground of the aircraft is interrupted and the dispersion of electricity may be prevented or hindered.

SUMMARY

In various embodiments, an aircraft evacuation assembly for electricity dispersion is disclosed. The evacuation assembly may include a composite packboard housing defining a packboard compartment, wherein the composite packboard housing is electrically nonconductive, and a girt mounted to the composite packboard housing and disposed in the packboard compartment. The evacuation assembly may further include a metal stud extending through the composite packboard housing, wherein the metal stud comprises a first end portion disposed external to the packboard compartment and a second end portion disposed internal to the packboard compartment in electrical contact with the girt. The evacuation assembly may further include a flexible strip attached to an external surface, relative to the packboard compartment, of the composite packboard housing. The flexible strip may be electrically conductive and the flexible strip may extend between and electrically connect the first end portion of the metal stud and an electrical interface.

In various embodiments, the external surface is inboard relative to the aircraft. In various embodiments, cumulative electrical resistance from an evacuation slide mounted to the girt to a main electrical ground electrically connected to the electrical interface is less than 1 mega ohm.

In various embodiments, the flexible strip includes a fabric base and an electrically conductive coating coupled to the fabric base. The electrically conductive coating may be a conductive carbon material. In various embodiments, the flexible strip has metallic threads interwoven with at least one of fabric threads, plastic threads, composite threads, and carbon fibers. The flexible strip may include a contact adhesive for attaching to the external surface of the composite packboard housing. The flexible strip may have a thickness, in a direction perpendicular to the external surface of the composite packboard housing, less than about 0.1 inches.

The evacuation assembly, according to various embodiments, may further include an evacuation slide mechanically and electrically connected to the girt. In various embodiments, the metal stud is a structural fastener that extends completely through the composite packboard housing and the second end portion of the metal stud is mechanically coupled to the girt. In various embodiments, the girt is electrically conductive.

In various embodiments, a flexible strip for electrically connecting a first location on a nonconductive aircraft component to a second location on the nonconductive aircraft component. The flexible strip may include a base and at least one electrically conductive material coupled to the base. The flexible strip may have a low profile from the first location to the second location of the nonconductive aircraft component.

In various embodiments, the flexible strip may further include an adhesive layer for attaching the flexible strip to the nonconductive aircraft component. The adhesive layer may be a contact adhesive. In various embodiments, the at least one electrically conductive material may be a metallic coating and the base may be made of fabric material. The flexible strip may have a non-linear shape configured to contour a specific geometry of the nonconductive aircraft component.

In various embodiments, the flexible strip has a thickness, in a direction perpendicular to an external surface of the nonconductive aircraft component, less than about 0.1 inches. In various embodiments, the thickness of the flexible strip is less than about 0.03 inches.

In various embodiments, a method of manufacturing a packboard is disclosed herein. The method may include attaching a flexible strip to a composite packboard housing. The composite packboard housing may be electrically nonconductive and the composite packboard housing may define a packboard compartment. Further, the flexible strip may be electrically conductive and may be attached to an external surface, relative to the packboard compartment, of the composite packboard housing.

The method may further include electrically connecting a first section of the flexible strip to a first end portion of a metal stud. The metal stud may extend through the composite packboard housing, the first end portion of the metal stud may be disposed external to the packboard compartment, and a second end portion of the metal stud may be disposed internal to the packboard compartment and is configured to be in electrical contact with a girt mounted in the packboard compartment. The method may further include electrically connecting a second section of the flexible strip to an electrical interface that is configured to be electrically connected to a main electrical ground of an aircraft, wherein a path of the flexible strip from the first end portion of the metal stud to the electrical interface is non-linear and contours the external surface of the composite packboard housing.

In various embodiments, the method may include mounting the girt within the packboard compartment using the metal stud before attaching the flexible strip to the composite packboard housing. The method may also include mechanically and electrically connecting an evacuation slide to the girt.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
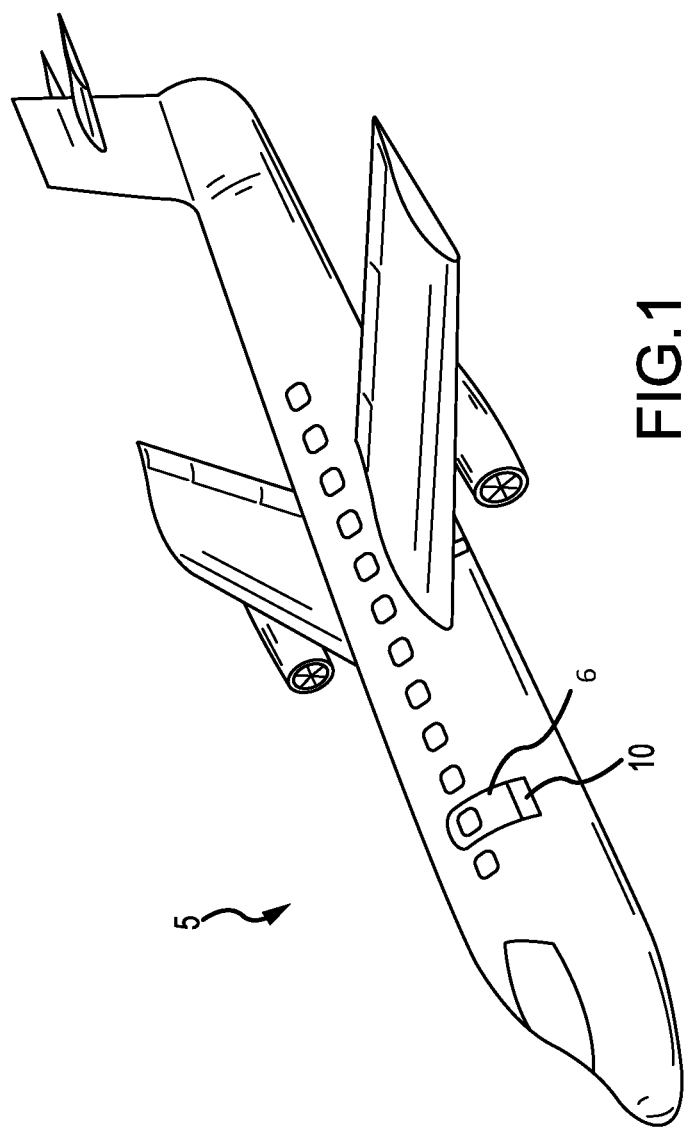
FIG. 1 illustrates a perspective view of an aircraft having an exterior mounted composite component, in accordance with various embodiments.
Figure 2:
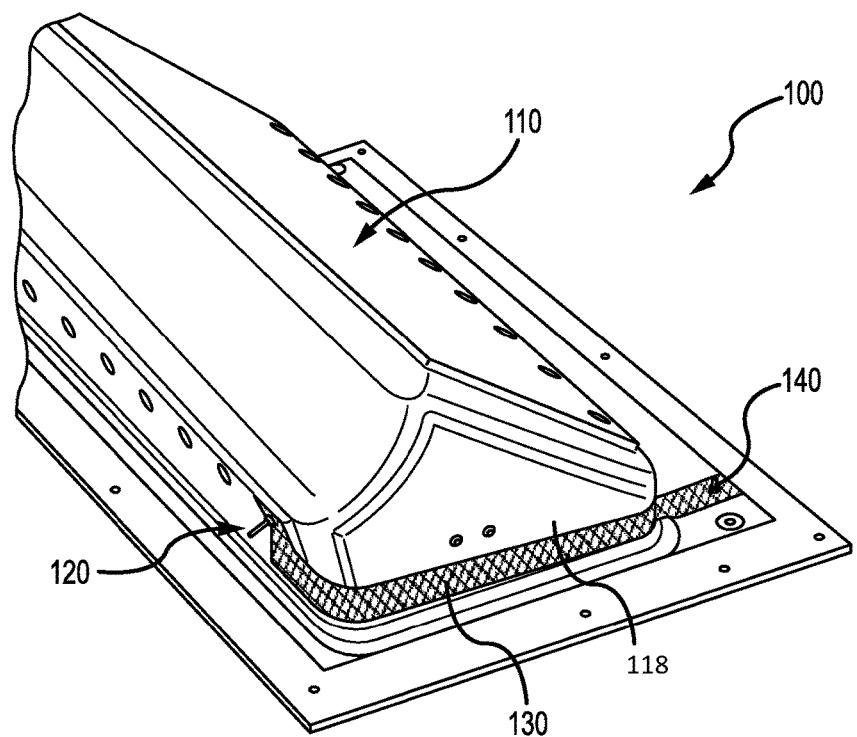
FIG. 2 illustrates a perspective view of a flexible strip attached to a surface of a packboard, in accordance with various embodiments.
Figure 3:
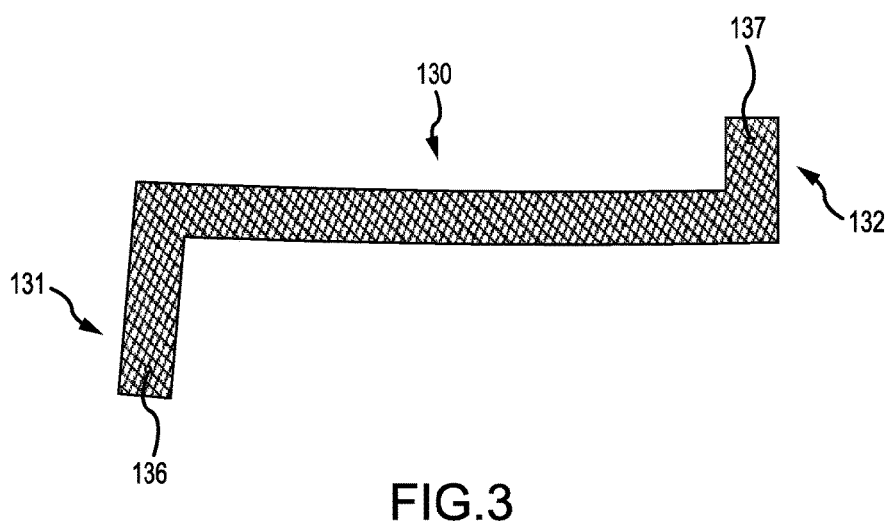
FIG. 3 illustrates a view of a flexible strip, in accordance with various embodiments.
Figure 4:
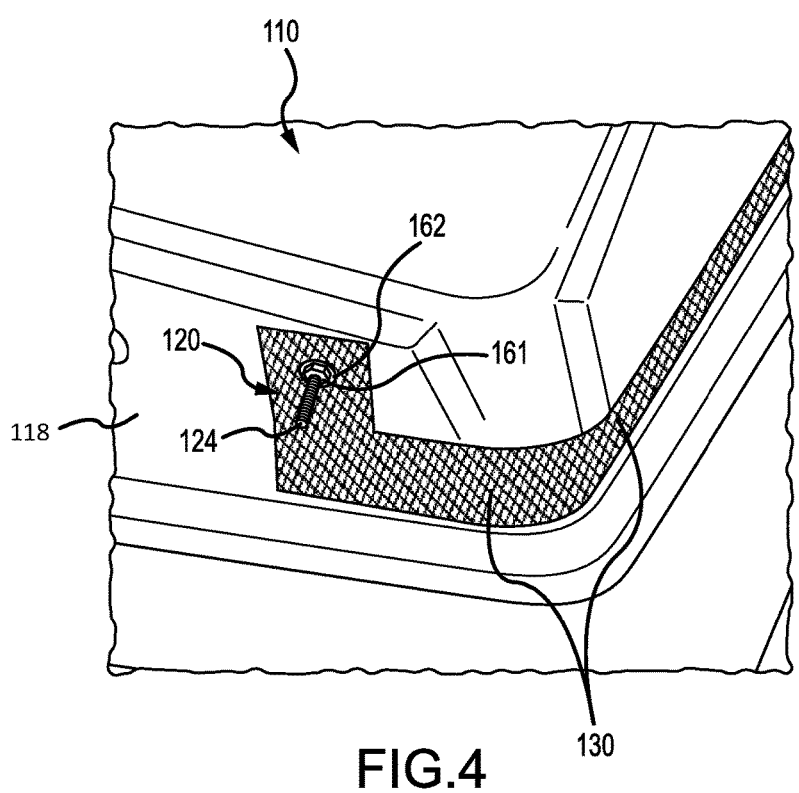
FIG. 4 illustrates a perspective view of a flexible strip attached to a surface of a packboard, in accordance with various embodiments.

FIG. 1 illustrates a perspective view of an aircraft 5 having an exterior mounted composite component 10, in accordance with various embodiments. Referring to FIG. 1, an exemplary aircraft 5 is shown, in accordance with various embodiments. Aircraft 5 may include a fuselage with wings fixed to the fuselage. An emergency exit door 6 may be disposed on fuselage to allow passengers to exit the aircraft 5. Emergency exit door 6, in various embodiments, may be situated over the wings of the aircraft such that passengers exiting through the emergency exit door 6 can exit onto the wing(s). The exterior mounted composite component 10 may be, for example, a packboard (with reference to FIG. 2) configured to store an evacuation slide assembly. In various embodiments, the composite component 10 may be a panel or some other exterior mounted composite structure of the aircraft 5.

As used herein, the term composite component 10 refers to an electrically nonconductive structure. Electrically nonconductive components of aircraft evacuation assemblies may hinder the conduction and dispersion of electricity. Accordingly, the present disclosure relates to transferring electricity from a deployed evacuation slide 150 (with reference to FIG. 5) that is mounted to an electrically nonconductive composite component 10 to the main electrical ground of the aircraft 5. Throughout the present disclosure, the terms "composite component 10" and "composite packboard housing 110" refer to electrically nonconductive material. That is, the term "composite packboard housing 110" specifically refers to one type of "composite component 10." Thus, while numerous details and various embodiments are included herein with reference to a packboard or the composite packboard housing 110, it is recognized that the electricity dispersion subject matter of the present disclosure may be applied and implemented with other, non-packboard-type composite components 10.

As used herein, the term "composite" refers to layers or fibers set in a resin matrix. In other words, the term "composite" may refer to carbon fibers, glass fibers, aramid fibers, and/or plastic fibers, among others, held together and set in a resin or epoxy matrix.

In various embodiments, and with reference to FIGS. 2-5, an evacuation assembly 100 is disclosed. The evacuation assembly 100 may include a composite packboard housing 110, a girt 7, an evacuation slide 150 (with reference to FIG. 5), a metal stud 120, and a flexible strip 130. Details relating to each of these components and the structural and electrical interconnectivity of these components are included below. Generally, electricity may be transferred through the evacuation slide 150, through the metal stud 120, and through the flexible strip 130 to an electrical interface 140 which is electrically connected to the main electrical ground of the aircraft.

The composite packboard housing 110 may be fuselage-mounted and may define a packboard compartment 116 (with reference to FIG. 5) within which one or more evacuation slides are stored. In various embodiments, an access panel may extend across the opening of the packboard compartment 116 to retain the evacuation slide 150. In various embodiments, for example, the evacuation slide 150 may jettison the access panel and deploy the inflatable evacuation slide 150 in response to the emergency exit door 6 opening or in response to another emergency evacuation activity.

The girt 7 may be mounted to an internal surface 117, relative to the packboard compartment 116, of the composite packboard housing 110 and the flexible strip 130 may be mounted to an external surface 118, relative to the packboard compartment 116 of the composite packboard housing 110. The terms "internal surface 117" and "external surface 118" are defined relative to the packboard compartment 116. That is, the internal surface 117 forms at least a portion of the interior wall(s) of the packboard compartment 116 while the external surface 118 faces outward relative to the packboard compartment 116 and is disposed without the packboard compartment 116. In various embodiments, the internal surface 117 and the external surface 118 may not be defined relative to the interior/exterior of the aircraft 5. In other words, both the internal surface 117 and the external surface 118 may be inboard surfaces of the aircraft 5. That is, the internal surface 117 and the external surface 118, according to various embodiments, may not be externally facing surfaces of the exterior skin of the aircraft 5.

Figure 5:
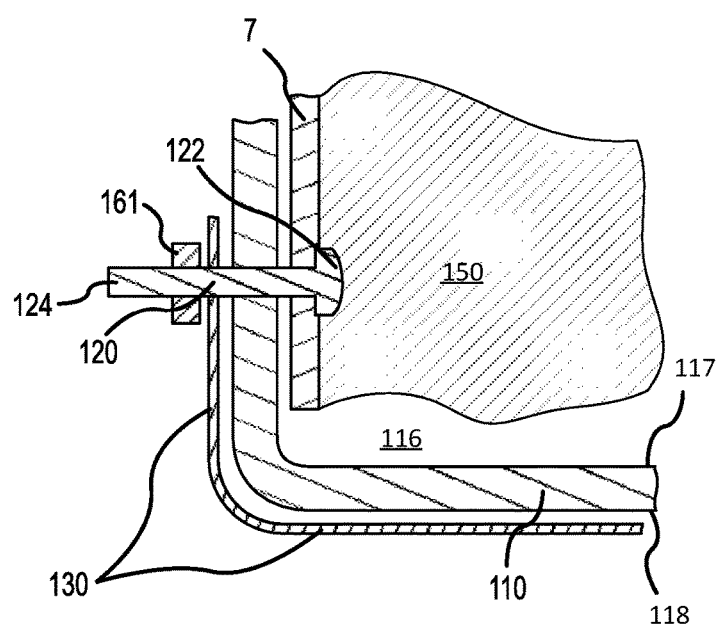
FIG. 5 illustrates a cross-section view of a metal stud extending through a composite packboard housing and a flexible strip electrically connected to the metal stud, in accordance with various embodiments.

The evacuation slide 150 may be mounted within the packboard compartment 116 via the girt 7 (with reference to FIG. 5). In various embodiments, the evacuation slide 150 is electrically conductive. In various embodiments, the evacuation slide 150 is a composite, plastic, or fabric material that may include an electrically conductive coating. In various embodiments, the girt 7 may also be electrically conductive.

In various embodiments, the metal stud 120 is electrically conductive and extends completely through the composite packboard housing 110. The metal stud 120 may be made from aluminum, steel, copper, nickel, tin, brass, tungsten, or iron, among others, or alloys thereof The metal stud 120, according to various embodiments, may include a first end portion 124 that may be disposed external the packboard compartment 116 and a second end portion 122 that may be disposed internal to the packboard compartment 116. In various embodiments, the metal stud 120 is a structural fastener that facilitates mounting the girt 7 to the composite packboard housing 110. In various embodiments, the second end portion 122 of the metal stud 150 is mechanically and directly coupled to the girt 7. While the first end portion 124 of the metal stud 120 illustrated in the figures protrudes a distance beyond the external surface 118 of the composite packboard housing 110, in various embodiments the first end portion 124 of the metal stud 120 may not protrude as far as illustrated so as to prevent the metal stud from catching on other components and/or to save space. That is, in various embodiments length of the protruding portion of the metal stud 120 may be less than depicted.

The first end portion 124 of the metal stud 120, which may be disposed external the packboard compartment 116, may be electrically connected to the flexible strip 130. In various embodiments, one or more connection features 161, 162, such as nuts and/or washers, may be implemented to mechanically couple the first end portion 124 of the metal stud 120 to the flexible strip 130.

The flexible strip 130, according to various embodiments, is electrically conductive. The flexible strip 130 may extend between and electrically connects the first end portion 124 of the metal stud 120 with the electrical interface 140. As mentioned above, the electrical interface 140 may be electrically connectable (or connected) to the main electrical ground of the aircraft. Thus, evacuation assembly 100 includes an electrically conductive path from the evacuation slide 150, through the girt 7, through the composite packboard housing 110 via the metal stud 120, and across the external surface 118 of the composite packboard housing 110 via the flexible strip 130 to the electrical interface 140. In various embodiments, the cumulative electrical resistance from the evacuation slide 150 to the main electrical ground is less than 5 mega ohms. In various embodiments, the cumulative electrical resistance from the evacuation slide 150 to the main electrical ground is less than 2 mega ohms. In various embodiments, the cumulative electrical resistance from the evacuation slide 150 to the main electrical ground is less than 1 mega ohm. In various embodiments, the electrical interface 140 is a lightning strike stud that completely extends through an exterior composite panel of the aircraft 5 for lightning strike dispersion.

The flexible strip 130, according to various embodiments, may include a base and an electrically conductive material coupled to the base. In various embodiments, for example, the base may be a fabric, plastic, composite, or textile material, among others. In various embodiments, the electrically conductive material may be metallic coating. For example, the metallic coating may be aluminum, steel, copper, nickel, tin, brass, tungsten, or iron, conductive carbon, among others, or alloys thereof. In various embodiments, the electrically conductive material of the flexible strip 130 may include metallic threads interwoven with the base. For example, fabric threads, plastic threads, composite threads, carbon fibers, etc. may be interwoven with electrically conductive threads/fibers. In various embodiments, the flexible strip 130 includes an adhesive, such as a contact adhesive, which holds the flexible strip 130 in position against the external surface 118 of the composite packboard housing 110.

In various embodiments, the flexible strip 130 may include a first section 131 and a second section 132. The first section 131 may be electrically connected to the first end portion 124 of the metal stud 120 and the second section 132 may be electrically connected to the electrical interface 140. In various embodiments, the first section 131 of the flexible strip 130 may include a first coupling feature 136, such as an aperture, that may mechanically couple with the first end portion 124 of the metal stud. In various embodiments, the second section 132 of the flexible strip 130 may include a second coupling feature 137 that may mechanically couple with the electrical interface 140.

The flexible strip 130, according to various embodiments, may be attached to the external surface 118 of the composite packboard housing 110. As shown in the figures and according to various embodiments, the flexible strip 130 may be implemented in configurations in which the metal stud 120 and the electrical interface 140 are not easily interconnected electrically. That is, in various embodiments the orientation, position, and general location of the metal stud 120 relative to the electrical interface 140 is such that electrically connecting the two together is difficult for conventional electrical conduction means. The flexible strip 130, however, may be quickly attached to the external surface 118 of the composite packboard housing 110 and provides a simple manner for electrically connecting the metal stud 120 with the electrical interface 140.

Because the composite packboard housing 110 may be configured to be removed from the aircraft, according to various embodiments, the flexible strip 130 may have a low profile to prevent the flexible strip 130 from being torn, ripped, or otherwise damaged. The term "low profile" refers to a thickness of the flexible strip 130, in a direction perpendicular to the external surface 118 of the composite packboard housing 110, that is less than about 0.1 inches (about 0.25 centimeters). In various embodiments, the thickness of the flexible strip 130 is less than about 0.03 inches (about 0.076 centimeters). In various embodiments, the thickness of the flexible strip 130 is between about 0.001 inches (about 0.0025 centimeters) and about 0.03 inches (about 0.076 centimeters). Because the flexible strip 130 has a low profile and because the flexible strip 130 attaches to and directly contours the external surface 118 of the composite packboard housing 110, the likelihood of tearing or otherwise damaging the flexible strip 130 during a packboard-removal operation is greatly reduced when compared with conventional electrical conduction means, such as cables or wires.

For example, in various embodiments the composite packboard housing 110 may be removed from the aircraft 5 to service the evacuation assembly 100 and/or to replace various components of the evacuation assembly 100. Because the flexible strip 130 has a low profile, the flexible strip 130 remains attached to composite packboard housing 110 and the electrical pathway between the metal stud 120 and the electrical interface 140 is maintained. In various embodiments, the flexible strip 130 may have a non-linear shape that is customized, for example, for a specific geometry of the external surface 118 of the composite packboard housing 110.

Figure 6:
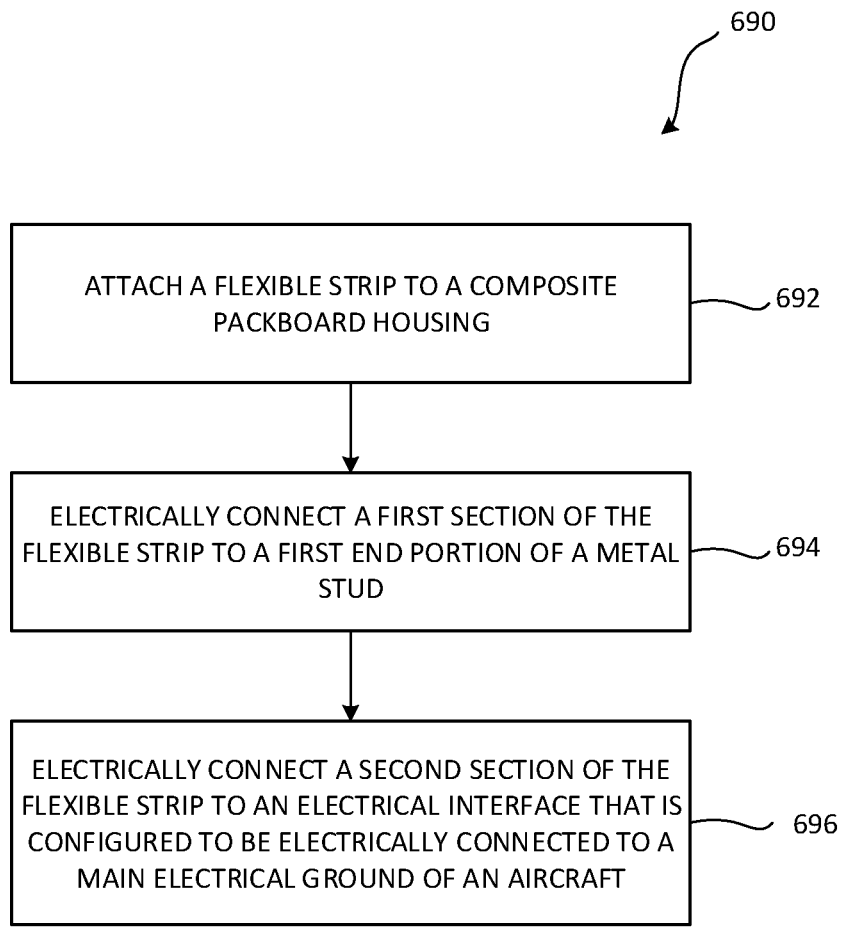
FIG. 6 illustrates a schematic flow chart diagram of a method for manufacturing a packboard, in accordance with various embodiments.

FIG. 6 illustrates a schematic flow chart diagram of a method 690 for manufacturing an evacuation assembly 100. In various embodiments, the method 690 may include attaching the flexible strip 130 to the external surface 118 of the composite packboard housing 110 (step 692). As mentioned above, the composite packboard housing 110 may be electrically nonconductive and may be shaped to form the packboard compartment 116. According to various embodiments, the flexible strip 130 may be electrically conductive.

The method 690 may further include electrically connecting the first section 131 of the flexible strip 130 to the first end portion 124 of the metal stud 120 (step 694). According to various embodiments, the metal stud 120 extends completely through the composite packboard housing 110 such that the first end portion 124 of the metal stud is disposed external the packboard compartment 116 and the second end portion 122 of the metal stud 120 disposed internal the packboard compartment 116 and is configured to be electrically connected with an evacuation slide 150 housed in the packboard compartment 116.

According to various embodiments, the method 690 may further include electrically connecting the second section 132 of the flexible strip 130 to the electrical interface 140 that is configured to be electrically connected to the main electrical ground of the aircraft 5 (step 696). According to various embodiments, the path of the flexible strip 130 from the first end portion 124 of the metal stud 120 to the electrical interface 140 is non-linear and contours the external surface 118 of the composite packboard housing 110. According to various embodiments, the method 690 may further include mounting the girt 7 within the packboard compartment 116 using the metal stud 120 before attaching the flexible strip 130 to the composite packboard housing 110 (step 692).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation assembly for an aircraft, the evacuation assembly comprising:
    a composite packboard housing that is electrically nonconductive, the composite packboard housing defining a packboard compartment;
    a girt mounted to the composite packboard housing and disposed in the packboard compartment;
    an evacuation slide that is electrically conductive, wherein the evacuation slide is mechanically mounted and electrically connected to the girt;
    a metal stud extending through the composite packboard housing, wherein the metal stud comprises a first end portion disposed external to the packboard compartment and a second end portion disposed internal to the packboard compartment, wherein the second end is electrically connected to the evacuation slide; and
    a flexible strip that is electrically conductive, wherein the flexible strip is attached to and directly contours an external surface, relative to the packboard compartment, of the composite packboard housing, wherein the external surface of the composite packboard housing is an inboard surface of the aircraft and is thus not an externally facing surface of an exterior skin of the aircraft, wherein the flexible strip extends between and electrically connects the first end portion of the metal stud and an electrical interface, wherein the electrical interface is configured to be electrically connected to a main electrical ground of the aircraft
    wherein the evacuation assembly comprises an electrically conductive path from the evacuation slide, through the girt, through the composite packboard housing via the metal stud, and across the external surface of the composite packboard housing via the flexible strip to the electrical interface.

2. The evacuation assembly of claim 1, wherein cumulative electrical resistance of the electrically conductive path is less than 1 mega ohm.

3. The evacuation assembly of claim 1, wherein the flexible strip comprises a fabric base and an electrically conductive coating coupled to the fabric base.

4. The evacuation assembly of claim 1, wherein the external surface is inboard relative to the aircraft.

5. The evacuation assembly of claim 1, wherein the flexible strip comprises electrically conductive threads interwoven with at least one of fabric threads, plastic threads, composite threads, and carbon fibers.

6. The evacuation assembly of claim 1, wherein the flexible strip comprises a contact adhesive for attaching to the external surface of the composite packboard housing.

7. The evacuation assembly of claim 1, wherein the flexible strip has a thickness, in a direction perpendicular to the external surface of the composite packboard housing, less than about 0.1 inches.

8. The evacuation assembly of claim 1, wherein the metal stud is a structural fastener that extends completely through the composite packboard housing and the second end portion of the metal stud is mechanically coupled to the girt.

9. The evacuation assembly of claim 8, wherein the girt is electrically conductive.

* * * * *